Figure 1:
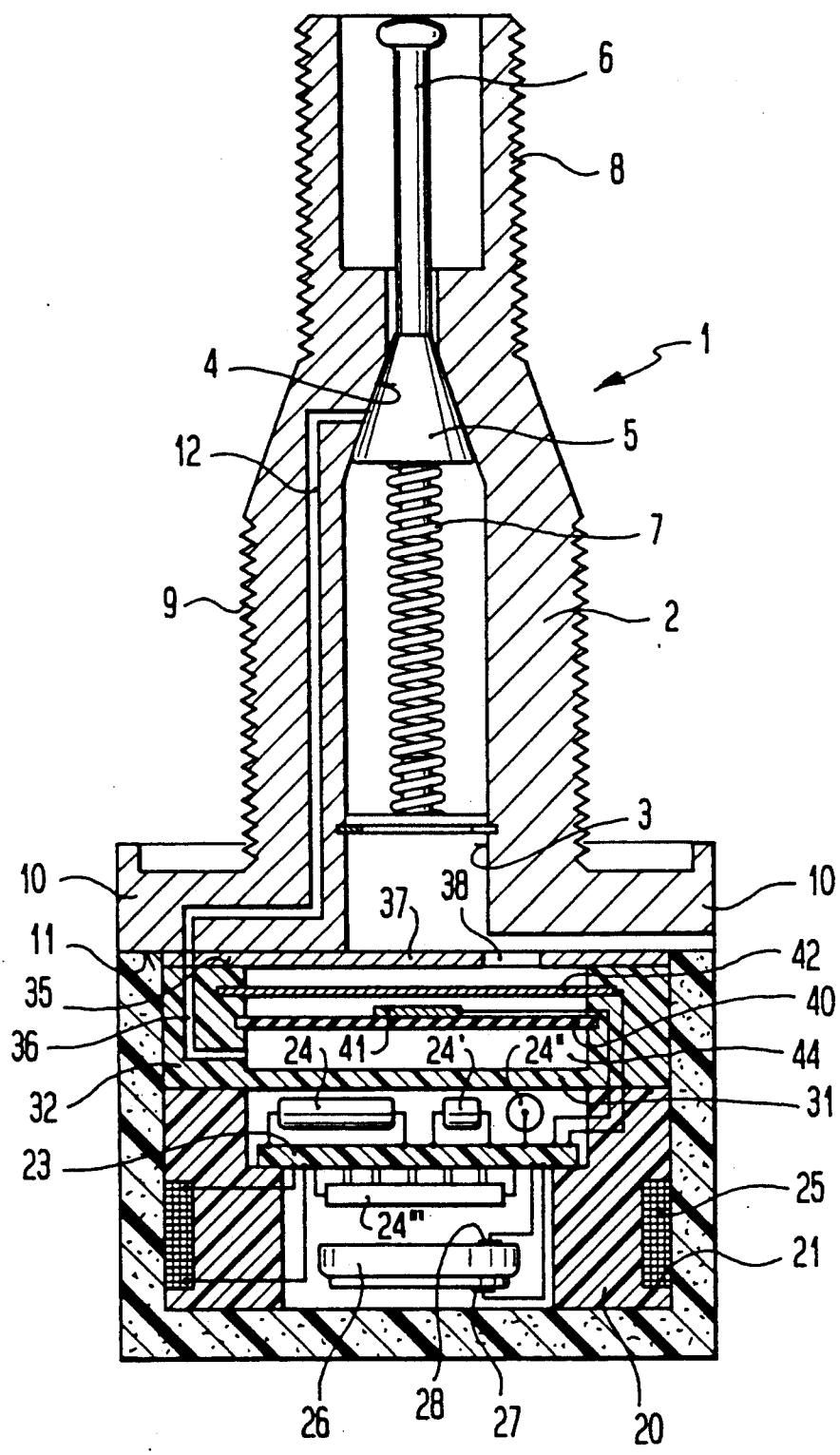

United States Patent [19]

Achterholt

[11] Patent Number: 5,040,561

[45] Date of Patent: Aug. 20, 1991

[54] SIGNAL GENERATING TIRE VALVE

[76] Inventor: Rainer Achterholt, Sportplatzweg 7, D-8968 Durach/Weidach, Fed. Rep. of Germany

[21] Appl. No.: 586,777

[22] Filed: Sep. 7, 1990

[30] Foreign Application Priority Data

Sep. 12, 1989 [DE] Fed. Rep. of Germany ....... 3930479

[51] Int. Cl.⁵ ............................................. B60C 23/02
[52] U.S. Cl. .................................. 137/227; 116/34 R; 73/146.5; 340/447
[58] Field of Search ............. 137/223, 227; 116/34 R, 116/34 A, 34 B; 73/146.3, 146.4, 146.5; 340/442, 447

[56] References Cited

U.S. PATENT DOCUMENTS

| | | | |
|---|---|---|---|
| 3,537,068 | 10/1970 | Amundsen, Jr. | 340/442 |
| 3,760,350 | 9/1973 | Johnson | 340/442 |
| 4,037,192 | 7/1977 | Cowit | 340/447 |
| 4,048,614 | 9/1977 | Shumway | 340/447 |
| 4,174,515 | 11/1979 | Marzolf | 340/447 |
| 4,177,671 | 12/1979 | Ichihara et al. | 73/146.5 |
| 4,562,874 | 1/1986 | Scheller | 73/146.5 X |
| 4,816,802 | 3/1989 | Doerksen et al. | 340/447 |

Primary Examiner—John Rivell
Attorney, Agent, or Firm—Pollock, Vande Sande & Priddy

[57] ABSTRACT

A tire valve comprises means for generating a wireless transmittable pressure drop indicating signal. The valve comprises a valve foot attachable to a tire rim and a valve shaft extending from said valve foot. A signal generating means is mounted on said valve foot at a valve foot side remote from said valve shaft. Said signal generating means comprises a reference pressure chamber which is admittable with a desired pressure. A diaphragm defines said reference pressure chamber and is admittable with the tire pressure to be controlled. Further, said signal generating means includes a transmitter means, a power supply means and switching means which is regularly hold in an opened position, but which is closed with a diaphragm deflection, whereupon the transmitter means is activated. The transmitter circuit comprises a sequence control which terminates a signal transmission after a short duration thereof and resets the transmitter means in a state to become activated again.

15 Claims, 2 Drawing Sheets

SIGNAL GENERATING TIRE VALVE

The present invention is related to a valve having means for generating a wireless transmittable pressure drop indicating signal. This valve is especially suited for tires of passenger cars, lorries, trucks and the like. This valve may be used with tube tires and with tube-less tires.

There are some prior proposals to provide a tire valve which generates a pressure drop indicating signal. For example, the German Offenlegungsschrift No. 36 05 661 discloses a tire valve having means for generating a wireless transmittable pressure drop indicating signal. Said known tire valve comprises a valve foot which is attachable to a tire rim. A valve shaft is extending from said valve foot, and a tire valve means is arranged within said valve shaft. A signal generating means comprises a diaphragm which may be admitted with the tire pressure to be controlled and which is deflectable due to an anomal tire pressure. Further, said signal generating means comprises a transmitter means, a power supply means and a mechanical switching means being regularly opened and adapted to be completed with a deflection of said diaphragm, wherein a switching means completion causes an activation of said transmitter means.

The signal generating means is mounted sidewise to the valve shaft of the known tire valve and may impair the optical impression and may interfere with any attachment of other wheel components such as ornamental hub caps and the like. The diaphragm of the known device is biased by a spring. Typically said type of arrangement is designed for a narrow pressure range which is limited by the spring constant. The known diaphragm is continuously biased by the tire pressure which reduces any response of the instrument. Further, a typical tire use includes admitted tire pressure variations which may cause a diaphragm deflection and a respective false alarm. The continuously biased diaphragm is arranged to actuate a switching means due to an anomal tire pressure, and said switching means will activate the transmitter means. As long as the anomal tire pressure is prevailing, the transmitter means remains activated and draws electrical energy from the power supply means. There are severe doubts whether the known tire valve device is realizable or has been realized in the past.

Further, U.S. Pat. No. 4,819,686 (Achterholt) discloses a tire valve cap providing a visible pressure drop indicating signal. The known valve cap comprises a deflectable diaphragm which separates a housing interior into a first chamber which is admitted with the tire pressure to be controlled and into a reference pressure chamber which is admitted with a desired pressure when the valve cap is screwed onto a tire valve. Said reference pressure chamber is partly defined by a transparent housing portion. Any reduction of the tire pressure to be controlled relative to the desired pressure will cause the diaphragm to converge toward the transparent housing portion, thus serving as an indication. The known valve cap is not adapted to generate a wireless signal transmission.

It is a primary object of the present invention to provide a tire valve having means for generating a wireless transmittable pressure drop indicating signal, which tire valve is not distinguishable with respect to optical impression and handling from known tire valves, the signal generating means thereof is highly sensitive and works in a wide range of different tire pressures and is not disturbed by usual admitted tire pressure variations, and the transmitter means thereof is maintenancefree and designed for a multi-years usage duration including a large number of alarm signals which may be distinguished safely from other false or foreign signals.

According to a further object of the present invention said tire valve is of simple structure and can be fabricated economically.

In accordance with the present invention, a tire valve is provided having means for generating a wireless transmittable pressure drop indicating signal, wherein the tire valve is comprising:
 a valve foot attachable to a tire rim;
 a valve shaft extending from said valve foot;
 a tire valve means arranged within said valve shaft; and
 a signal generating means mounted on said valve foot at a valve foot side remote from said valve shaft, and comprising:
  a power supply means;
  a transmitter means which—when activated—generates a signal transmission and comprising a sequence control which terminates said signal transmission after a short duration thereof and resets said transmitter means in a state to become activated again;
  a diaphragm being admittable with the tire pressure to be controlled and being deflectable due to an anomal tire pressure;
  a mechanical switching means being regularly opened and adapted to be completed with a deflection of said diaphragm, said switching means completion causes an activation of said transmitter means; and
  a reference pressure chamber being admittable with a desired pressure when the tire valve means is opened and adapted to be closed pressure-tight when the tire valve means is closed,
  wheren said reference pressure chamber being partly defined by said diaphragm which takes a position deflected away from said reference pressure chamber and causes completion of said switching means whenever the tire pressure to be controlled is lower than the desired pressure.

In accordance with the present invention, a tire valve is provided which generates a wireless transmittable pressure drop indicating signal and which may be handled like a conventional tire valve. The signal generating means is mounted on the valve foot at a valve foot side remote from the valve shaft. Therefore, in use, the signal generating means is located within the tire interior and cannot impair the optical impression of the valve or cannot interfere with any attachment of other wheel components like ornamental hub caps and the like. The components of the signal generating means are protected against non-admitted removal from the tire valve. The signal generating means including the reference pressure chamber, the electric and/or electronic components of the transmitter means and the battery or storage battery forms a single unit which is simply designed and assembled, and which has small dimensions and a low weight. For example, a signal generating means has been formed like a cylindrical unit having an outer diameter of approximately 18 mm, an axial length of about 7 mm and a weight—including battery—of less than 10 g. Any presence of said signal generating means does not increase essentially any un-balance caused by the tire valve. Because the transmitter circuits stop any signal transmission automatically after a short duration thereof, any signal alarm requires solely a small amount of electrical energy. For example, a lithium-battery providing a voltage of 3 Volt and a capacity of approximately 40 milli Ampere hours may be used as power supply means of the signal generating means. A battery of said type is suited to power the signal generating means in order to generate at least 500 to 1000 signal alarm pulses. Therefore, the signal generating means may be housed maintenance-free within the tire interior. Because the tire pressure is controlled with a reference pressure chamber wherein a given desired pressure is stored, the diaphragm is exposed solely to the small pressure differences between the tire pressure to be controlled and the given desired pressure. The diaphragm may be formed thin and highly sensitive. A single embodiment of a signal generating means may be used with a wide range of different tire pressures, because solely the difference between the tire pressure to be controlled and the desired pressure stored within the reference pressure chamber is monitored and used to trigger any signal alarm pulse. The intended reference pressure chamber provides optimal results with a mechanically operable electrical switching means, because a relatively small diaphragm deflection is sufficient to complete the switching means which is maintained regularly in the open status. Any diaphragm deflection does not require any movement of a substantial mass or does not require any overcoming of spring biasing. A high sensitivity is obtained, which is not impaired by usual, admitted tire pressure variations because said typical tire pressure variations form a pressure increase which does not cause any diaphragm deflection. A transmitter means is preferred which generates two different signal frequencies, which are transmitted alternately with a given pulse repetition. Thereto, a narrow and specific coupling with a given receiver means may be obtained which is practically not disturbed or impaired by any other signal sources. To each transmitter device or to each tire valve, respectively, is attributed a specifically tuned receiver means, wherein the maximum distance between receiver means and transmitter means is preferably less than 1000 mm. To each wheel is attributed a distinctive receiver means which is directly connected with an indication device arranged at the instrument panel of the vehicle. A single embodiment of the tire valve according to the present invention is suited for all the wheels of a vehicle. A typical vehicle tire comprises a cord ply made from steel; surprisingly, such a steel cord ply does not substantially hinder the transmission of signal frequencies and the safe receipt thereof with the receiver means. Under said conditions, a false alarm due to admitted tire pressure variations or due to foreign or external signal transmissions and in addition any disturbance of other receiver means is practically excluded.

Advantageous embodiments and further improvements of the tire valve may also be provided according to the present invention.

As stated above, the signal generating means comprises a reference pressure chamber which may be admitted with desired pressure when the tire valve means is opened and which is adapted to become closed pressure-tight when the tire valve means is closed. A typical, conventional tire valve comprises a valve foot for attaching the valve to a tire rim, and a valve shaft housing the tire valve means. Typically, said tire valve means comprising a valve bore provided with the valve seat and a valve body adapted to engage said valve seat in order to close the tire valve. According to a further aspect of the present invention, a first passage within said valve shaft is provided which opens into said valve seat and which connects the valve bore with the reference pressure chamber in order to admit said reference pressure chamber with the given desired pressure. Whenever the valve body is removed from the valve seat, for example by displacement of a valve plunger, in order to supply pressurized air via the tire valve into the tire interior, a fluid medium such as pressurized air may flow through the opened first passage, and the reference pressure chamber is admitted with the desired pressure. In the following, the valve body will engage the valve seat again in order to close the tire valve; concurrently therewith the first passage is closed, and the reference pressure chamber will be closed and will be maintained continuously closed pressure-tight.

According to an alternative embodiment, the valve bore may be provided with a second passage connecting the valve bore with the reference pressure chamber in order to admit said reference pressure chamber with the desired pressure. An auxiliary valve is arranged within said second passage and adapted to become opened or closed common with the tire valve. For example, said second passage may comprise a tube section aligned with the valve bore. Said tube section is provided with an auxiliary valve seat, and the auxiliary valve is a spring-loaded check valve arranged within said tube section. Regularly, said spring-loaded check valve is biased towards the auxiliary valve seat and takes its closed position. Whenever the valve plunger is pushed down in order to open the tire valve, an extension of said valve plunger acts upon said auxiliary valve and opens said valve. With returning of the valve plunger, the spring of the spring-loaded auxiliary valve will press the check valve body against the auxiliary valve seat and the auxiliary valve becomes closed again.

As stated above, the signal generating means comprises a reference pressure chamber wherein a given desired pressure is stored continuously. According to a further aspect of the present invention said reference pressure chamber is formed within a flat cell comprising a cell bottom and a circumferential cell wall having a cell wall front face. A cell opening is closed with the diaphragm which is pressure-tightly fixed to an inner face of the circumferential cell wall. A cylindrical section of the circumferential cell wall extends beyond the diaphragm.

A third passage is recessed within said circumferential cell wall, starting at a front face of said cell wall, opening into the reference pressure chamber and being connected to the first or second passage. A fluid medium may flow through said third passage in order to admit the reference pressure chamber with the desired pressure.

A conductor section may be fixed at opposite spots of the cylindrical section of the circumferential cell wall extending beyond the diaphragm. For example, said conductor section may be formed like a metallic clip or little rod, being electrically conductive connected with a circuit board of the transmitter means and forming a fixed arranged contact of the switching means. Said conductor section is arranged parallel to the diaphragm and in a short distance to a rest position thereof.

A moveably arranged contact of the switching means is formed by a small metal plate which is attached to a central portion of the diaphragm. Said metal plate is electrically conductive connected with a circuit board of the transmitter means, and will engage the conductor section in order to complete a electrical circuit of the switching means with a respective diaphragm deflection. Thereupon a circuit of the transmitter means will become activated, and the transmitter means generates signal frequencies. The switching means works relyably, sensibly and fast, because there is no need to overcome substantial counter-forces. A diaphragm deflection of a few 1/10 millimeters is sufficient in order to complete the switching means.

As stated above the signal generating means comprises a power supply means in order to supply current-/voltage to the electric and/or electronic components of the transmitter means. For example, said power supply means may be a lithium battery having a capacity of at least 40 milli Ampere hours and proving a voltage of 3 volt. A battery of said type may be formed as a button cell and may be inserted within the housing of the signal generating means.

Typically, a circuit of the transmitter means is maintained regularly in a stand-by condition, wherein nearly no electrical power is drawn from the battery. Any transition from the stand-by condition into an activated state, wherein the transmitter means will generate signal frequencies, is caused by a completion of the switching means.

Whenever the switching means has been completed or closed a signal transmission is generated for a limitated duration. Preferably said signal transmission is limitated to a duration of approximately 1 to 3 seconds. Preferably said signal transmission comprises alternate and periodical transmission of different signal frequencies. For example, said alternate and periodical transmission of different signal frequencies may be generated with a transmitter means comprising essentially a digital circuit and an oscillating circuit provided with a coil which is formed as a transmitting antenna. According to an essential aspect of the present invention said digital circuit comprises a sequence control which terminates a signal transmission after a short duration thereof and resets the transmitter means again in a stand-by condition wherein the transmitter means is adapted to become activated again.

According to a further aspect of the present invention the digital circuit comprises a number of essential functional groups, such as a RC-oscillator, a trigger circuit, a modulation circuit, a multi-stage frequency divider and a power amplifier which may be switched on or off. The RC-oscillator provides different signal frequencies, wherein each specific frequency is defined by the resistor component (R) and the capacitor component (C) thereof. Preferably the circuit is designed such that different feedbacks of the frequency divider will trigger respective functional groups of the digital circuit such that the transmitter circuit will be started or triggered with completion of the switching means and will perform a complete signal transmission. Following said signal transmission, the power amplifier and the RC-oscillator will be switched off which reduces essentially the electrical power drawn from the battery. The complete circuit is switched back to a stand-by condition, spends nearly no electrical power and is ready for activation for a new signal transmission, even if the switching means remains completed or closed. A renewed signal transmission starts not earlier before the diaphragm has been returned in its rest position, the switching means has been opened, and the reference pressure chamber has sensed a tire pressure drop, whereupon the diaphragm is deflected again in order to complete the switching means.

According to a further preferred aspect of the present invention the alarm signal comprises relatively long-waved frequencies in the kHz-range. As a matter of experience, nearly no disturbance due to another of foreign signal sources have to be expected in said kHz-frequency range. Nevertheless, a disturbance-free transmission of the alarm signal to the receiver means can be effected. Preferably, said receiver means are arranged in each wheel area of the vehicle. Preferably, the distance between each transmitter means or tire valve, respectively, and the attributed receiver means does not exceed 1000 mm.

In order to increase the identification between each transmitter means and its attributed receiver means and in order to exclude essentially any false indications due to foreign signals, each generated signal comprises preferably two different frequencies. For example, each complete signal may comprise a first frequency of 9.6 kHz and a second frequency of 10.4 kHz, and each frequency is generated and transmitted alternately for a duration of about 10 to 20 milli seconds. The complete duration of each complete signal amounts preferably a few seconds, for example 1 to 3 seconds, and more preferred about 1.6 seconds. Under these conditions the capacity of the above-mentioned lithium battery is sufficient to supply at least 500 to 1000 alarm pulses; this is sufficient for the complete to be expected life time of the tire valve according to the present invention. Thereto, the signal generating means including the power supply means may be arranged at a non-easily accessible location within the tire interior.

Preferably, the complete transmitter means including any electric and/or electronic components thereof is formed like a module. The components including two integrated circuit chips, a RC-oscillator and a number of capacitor means and resistor means are mounted on a board, which is formed as a printed circuit. In a practical embodiment a circular circuit board having a diameter of approximately 17 mm is sufficient to accept the complete number of components. Said circuit board including said components is located safely within a sleeve made of plastic material; said plastic sleeve comprises an outer circular face, and a groove is recessed in said outer face; a transmitting antenna is formed like a wire coil and arranged within said groove. The complete signal generating means including reference pressure chamber comprising a switching means, transmitter means and power supply means may be formed as a single integrated unit having a diameter of about 18 mm and a length of about 7 mm. Aside from a third passage providing admittance of the desired pressure to the reference pressure chamber, the complete unit may be formed incapsulated in order to avoid any impairment due to components of the fluid member inside of the tire. The complete integrated unit has a weight of less than 10 g and does not increase essentially the weight of a conventional metal valve for tires.

A specific receiver means is attributed to each tire valve including the transmitter means thereof. Typically, each receiver means comprises a ferrit rod having a receiver antenna and a known receiver circuit. The electrical power need of the receiver circuit may be provided with the power supply of the vehicle. The receiver circuit comprises outputs which are operatively connected with an indicator device mounted at the instrument panel or the like of the vehicle. Said indicator device includes an evaluation circuit which attributes signal pulses obtained from a specific transmitter/receiver means to the attributed wheel indication. Further, said indicator device generates a visible and/or audible warning signal due to the received signal pulses; even after termination of said signal pulses the warning signal is maintained as long until the vehicle driver extinguishes or resets the warning signal indication.

After transmission of a number of signal pulses the signal generating means is renewed ready for transmission a new sequence of signal pulses, provided that the diaphragm has taken its rest position again. Especially, the diaphragm may be returned in its rest position by pushing down the valve plunger of the tire valve, because an access to the reference pressure chamber is opened and a pressure compensation or a new setting of the desired pressure may be performed.

Figure 2:
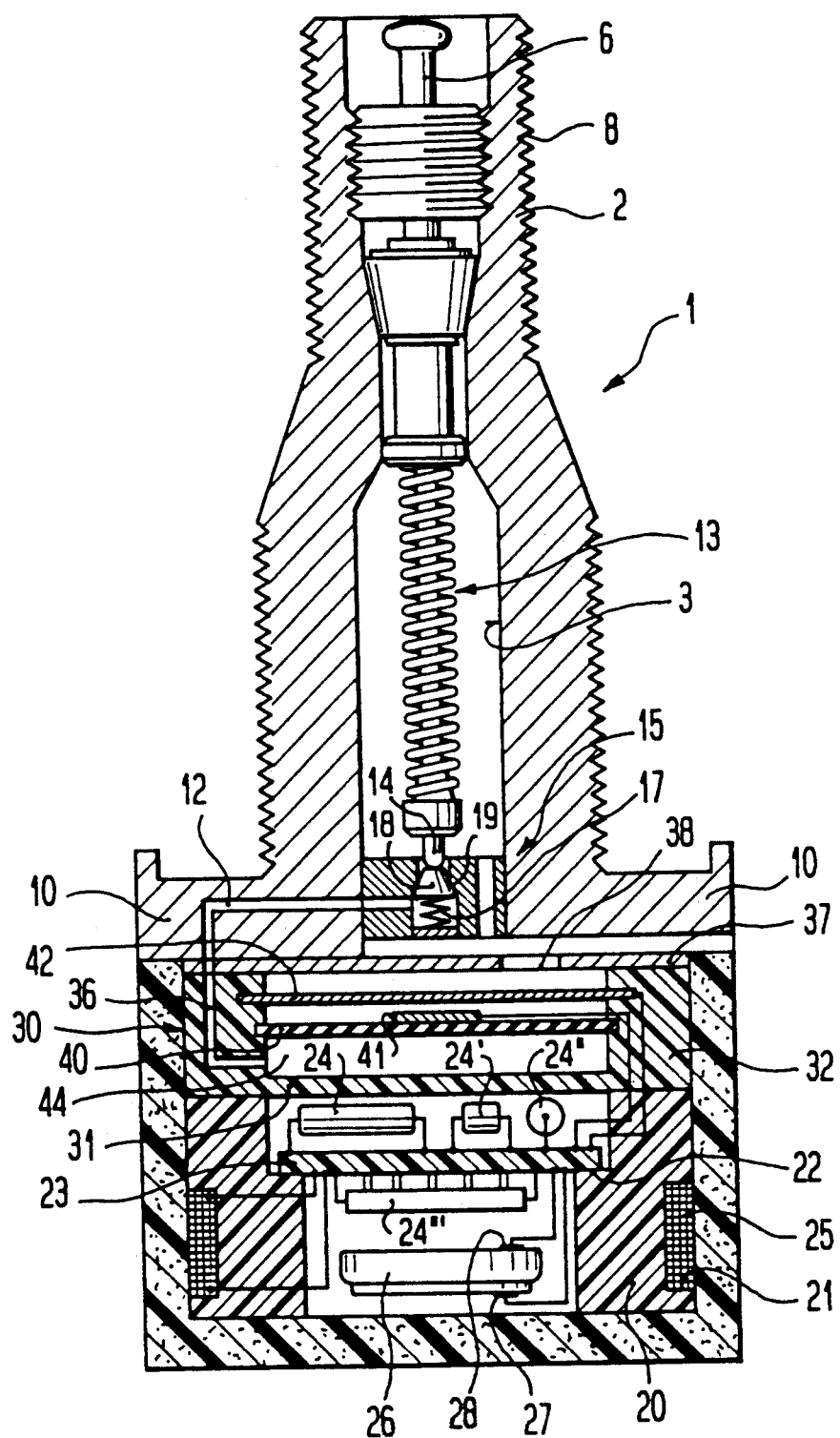

In the following the present invention will be explained in more detail with reference to the drawings, in which:

FIG. 1 is a schematic sectional view of a tire valve according to the present invention including a signal generating means thereof; and FIG. 2 is a schematic sectional view of a modified embodiment of the tire valve according to FIG. 1, showing an alternative mode for admittance the desired pressure to the reference pressure chamber.

FIG. 1 illustrates an embodiment of a tire valve according to the present invention comprising a tire valve means 1 and a signal generating means. The valve means 1 includes a valve shaft 2 defining a valve bore 3. A valve seat 4 is formed at a inner circumferential face of the valve bore 3. A valve body 5 is adapted to engage said valve seat 4. A spring 7 may press said valve body 5 against the valve seat 4 in order to close the valve means 1. A valve plunger 6 is attached in a single-piece embodiment to the valve body 5; by displacement of said valve plunger 6 the valve body 5 may be disengaged from the valve seat 4 and a pressurized fluid medium may flow through the valve bore 3. An exterior circumferential face of the valve shaft 2 may be provided with stepped exterior threaded sections 8 and 9 in order to fasten the tire valve to a wheel rim with the aid of a nut. A valve foot 10 is attached to the valve shaft 2 in a single-piece manner.

In a typical manner of use the valve 1 is passed through a valve opening recessed in a wheel rim in such a manner that the valve foot 10—optionally with a—non-illustrated—intermediate insulating insert—will engage the inner wall of the wheel rim. Further, a union nut is screwed on the external thread 9, and the valve 1 is fixed to the wheel rim. In the present case, the valve 1 is designed for a tube-less pneumatic vehicle tire. The complete valve 1 is typically made from metal, for example from a zinc/copper alloy or an aluminum alloy.

According to an aspect of the present invention a first passage 12 is recessed within the valve shaft 2; at the one side said first passage 12 discharges into the valve seat 4, and at the other side said first passage 12 discharges at a front face 11 of the valve foot 10. As far as the valve body 5 engages the valve seat 4, the first passage 12 is closed. Whenever the valve body 5 is removed from the valve seat 4, any pressurized fluid medium may flow through the first passage 12.

At a valve foot side remote from said valve shaft 2, a signal generating means is arranged in such a manner that a flow connection is established between the valve bore 3 and an interior space of the pneumatic tire.

Said signal generating means includes a sleeve 20 made from plastic material and comprising a circumferential inner and outer face; a circumferential groove 21 is recessed in the outer face. The inner face is provided with a circumferential shoulder 22, and a circuit board 23 is supported on said shoulder 22. The electric and/or electronic components 24, 24', 24" and 24'" of a transmitter means are mounted on said circuit board 23. Further, the transmitter means includes a transmitter antenna 25 which is formed like a wire coil and arranged within the groove 21 recessed in the outer face of the sleeve 20. Further, a button cell 26 is arranged and fixed within the interior of the sleeve 20. The button cell 26 is provided with terminals 27 and 28, being operatively connected with the circuit board 23.

Further, the signal generating means includes a flat cell 30 comprising a cell bottom 31 and a circumferential cell wall 32 having a wall front face 35. A cell opening is covered by a diaphragm 40 which is fixed at the inner side of the circumferential cell wall 32. A small metal plate is attached to a central section of the diaphragm 40. Said cell bottom 31, said cell circumferential wall 32 and said diaphragm 40 define a reference pressure chamber 44. A third passage 36 is recessed within the circumferential cell wall 32, which opens to the cell wall front face 35 and into the reference pressure chamber 44. Said third passage 36 is aligned with a section of the first passage 12 recessed within the valve foot 10 providing a flow connection from the valve seat 4 through the first passage 12 and the third passage 36 into the reference pressure chamber 44.

A circumferential section of the cell wall 32 is extending beyond the diaphragm 40. A conductor section 42 is mounted to said extending cell section 32. Said conductor section 42 is arranged parallel to the diaphragm 40 and in a small distance to a rest position of the diaphragm 40. The moveably arranged small metal plate 41 and the fixed arranged conductor section 42 form together a regularly opened mechanical switching means. Both, the metal plate 41 and the conductor section 42 are operatively connected with the circuit board 23. Any sufficient deflection of the diaphragm 40 will engage the metal plate 41 with the conductor section 42, and will close an electric circuit, which will activate a digital circuit of the transmitter means whereupon a signal transmission is generated.

As illustrated in FIG. 1, the sleeve 20 and the cell 30 including their specific components are mechanically connected with each other and form together a integrated unit. Said unit may be embedded within a casting resin 39 or may be incapsulated in another way in order to provide protection against the components of the pressurized fluid medium within the tire. Said unit may comprise an additional cover plate 37 which protects the diaphragm 40 against any direct impact of the pressurized fluid medium. An opening 38 is recessed within said cover plate 37 and allowing the tire pressure to be controlled to admit the diaphragm 40.

The FIG. 2 illustrates an alternative embodiment of the tire valve according to the present invention, having a signal generating means which is identical with the signal generating means of the embodiment according to FIG. 1. Contrarily, the valve means 1 comprises a conventional valve core 13 within a valve bore 3. Within said valve bore 3 and aligned with the valve core 13 is a tube section which is provided with an auxiliary valve seat 19. An auxiliary valve 15, for example a spring-loaded check valve is arranged within said tube section. A spring 18 pushes a valve body 17 of the auxiliary valve 15 against the auxiliary valve seat 19. The tube section is in flow connection with a second passage 12 and with the third passage 36. A rod 14 is mounted to and extends beyond the valve core 13. Whenever the valve plunger 6 is actuated, said rod 14 will strike the valve body 17 of the auxiliary valve 15 and will dis-engage said valve body 17 from the auxiliary valve seat 19. Pressurized fluid medium may enter into the tube section and flows through the second passage 12 and through the third passage 36 into the reference pressure chamber 44. Whenever the valve plunger 6 will take its starting position—biased by a spring of the valve core 13, the rod 14 will dis-engage from the valve body 17 of the auxiliary valve 15, and the spring 18 will push the valve body 17 again towards the auxiliary valve seat 19 and will closed pressure-tight and a desired pressure is stored therein continuously.

I claim:

1. A tire valve having means for generating a wireless transmittable pressure drop indicating signal,
the tire valve comprising:
   a valve foot attachable to a tire rim;
   a valve shaft extending from said valve foot;
   a tire valve means arranged within said valve shaft; and
   a signal generating means mounted on said valve foot at a valve foot side remote from said valve shaft, and comprising:
      a power supply means;
      a transmitter means which—when activated—generates a signal transmission and comprising a sequence control which terminates said signal transmission after a short duration thereof and resets said transmitter means in a state to become activated again;
      a diaphragm being admittable with the tire pressure to be controlled and being deflectable due to an anomal tire pressure;
      a mechanical switching means being regularly opened and adapted to be completed with a deflection of said diaphragm, said switching means completion causes an activation of said transmitter means; and
      a reference pressure chamber being admittable with a desired pressure when the tire valve means is opened and adapted to be closed pressure-tight when the tire valve means is closed,
   wherein said reference pressure chamber being partly defined by said diaphragm which takes a position deflected away from said reference pressure chamber and causes completion of said switching means whenever the tire pressure to be controlled is lower than the desired pressure.

2. The tire valve according to claim 1,
wherein said tire valve means comprising:
   a valve bore provided with a valve seat;
   a valve body adapted to engage said valve seat in order to close the tire valve; and
   a first passage opening into said valve seat and connecting the valve bore with the reference pressure chamber in order to admit said reference pressure chamber with the desired pressure.

3. The tire valve according to claim 1,
wherein said tire valve means comprising:
   a valve bore provided with a valve seat;
   a valve body adapted to engage said valve seat in order to close the tire valve;
   a second passage connecting said valve bore with the reference pressure chamber in order to admit said reference pressure chamber with the desired pressure; and
   an auxiliary valve arranged within said second passage and adapted to become opened or closed common with the tire valve.

4. The tire valve according to claim 3,
wherein said auxiliary valve is a spring-loaded check valve.

5. The tire valve according to claim 1,
wherein said signal generating means further comprising:
   a sleeve having an inner circumferential face; and
   a circuit board mounted on said inner circumferential face wherein any electric and electronic components of the transmitter means being attached to said board.

6. The tire valve according to claim 5,
wherein said sleeve having in addition an outer circumferential face provided with a circumferential recess; and
wherein the transmitter means comprising a transmitter coil which is formed as a wire coil and located within said recess.

7. The tire valve according to claim 5,
wherein the power supply means is a battery or storage battery which is arranged within said sleeve.

8. The tire valve according to claim 1,
wherein the signal generating means comprising a flat cell provided with a cell bottom and a circumferential cell wall, wherein a cell opening is closed by the diaphragm.

9. The tire valve according to claim 8,
wherein a third passage is recessed within said circumferential cell wall, starting at a front face of said cell wall, opening into said reference pressure chamber and providing a flow connection to the first or second passage.

10. The tire valve according to claim 1,
wherein said switching means comprising
   a small metal plate attached to a central portion of the diaphragm and electrically conductive connected to a circuit board; and
   a conductor section electrically conductive connected to a circuit board and arranged parallel to the diaphragm and in a short distance to a rest position of the diaphragm.

11. The tire valve according to claim 1,
wherein the transmitter means comprising:
   a digital circuit and an oscillating circuit provided with a coil which is formed as a transmitting antenna.

12. The tire valve according to claim 11,
wherein the digital circuit comprising:
   a RC-oscillator, a trigger circuit, a modulation circuit, a multi-stage frequency divider and a power applifier which may be switched on or off.

13. The tire valve according to claim 12,
wherein the transmitter means generates two different signal frequencies, being relatively long-waved in the kHz-range, and said different signal frequencies are transmitted alternately.

14. The tire valve according to claim 12, wherein the digital circuit comprises a sequence control which generates along with the RC-oscillator and with the frequency divider two different signal frequencies which are transmitted alternately, and further said sequence control terminates the signal transmission after a given number of cycles and resets the complete transmitter means in a state to become activated again.

15. The tire valve according to claim 14, wherein the signal transmission is stopped after a few seconds, preferably after 1 to 3 seconds.

* * * * *